United States Patent Office 3,506,739
Patented Apr. 14, 1970

3,506,739
GRAFT COPOLYMER OF ALIPHATIC POLYCARBONATE ON POLYMERIC BACKBONE HAVING PENDANT HYDROXY, CARBOXY OR AMINE GROUPS
James E. Cantrill, Pittsfield, Mass., assignor to General Electric Company, a corporation of New York
No Drawing. Continuation-in-part of application Ser. No. 533,788, Mar. 14, 1966. This application Nov. 13, 1967, Ser. No. 682,588
Int. Cl. C08g 39/10
U.S. Cl. 260—873
9 Claims

ABSTRACT OF THE DISCLOSURE

A thermoplastic graft copolymer of a polymer backbone having pendant thereon aliphatic polycarbonate groups, which aliphatic polycarbonate groups are attached to the polymer backbone by radicals which may be either carbonates, esters or carbamates or mixtures thereof. The thermoplastic graft copolymer consists of 30–96 weight percent of the aliphatic polycarbonate units and correspondingly 70–5 weight percent of the polymer backbone. The aliphatic polycarbonate groups pendant on the polymer backbone are the residue of at least two molecules of an aliphatic diol. It is essential that the graft copolymer remain thermoplastic.

---

This application is a continuation-in-part of co-pending application Ser. No. 533,788 filed Mar. 14, 1966, now abandoned.

This invention relates to thermoplastic graft copolymers and more particularly to a thermoplastic graft copolymer of a polymer backbone, an aliphatic diol and a carbonate precursor.

In recent years a great deal of effort has been devoted to the preparation and properties of thermoplastic graft copolymers. A graft copolymer consists of a backbone of one type of polymer or copolymer to which branches of another kind of polymer or copolymer are attached. Graft copolymerization is well suited to the production of polymers which are modified to either eliminate undesirable properties or to introduce desirable properties.

One of the objects of the present invention is to provide a thermoplastic graft copolymer in which aliphatic polycarbonate groups are grafted onto a polymer backbone.

This and other objects of this invention will become apparent from the following detailed description thereof.

Briefly, according to the invention, the foregoing and other objects are attained by reacting a polymer backbone containing functional groups pendant thereon with an aliphatic diol and a carbonate precursor to produce a thermoplastic graft copolymer. The functional groups pendant on the polymer backbone can be either a hydroxyl, a carboxyl or an amine group, or mixtures thereof.

The following examples are set forth to illustrate more clearly the principle and practice of this invention to those skilled in the art. Unless otherwise specified, where parts or percentages are mentioned, they are parts or percentages by weight.

EXAMPLE I

A poly(styrene-co-hydroxyethyl methacrylate) polymer is prepared by mixing a solution of 2.6 grams of hydroxyethyl methacrylate and 0.5 gram of benzoyl peroxide in 208 grams of styrene with a solution of 2.50 grams of polyacrylic acid in 750 grams of water. The mixture is heated under a nitrogen atmosphere at about 80° C. for about 16 hours. The polymer beads are filtered off and washed with water. The resulting polymer is the poly(styrene-co-hydroxyethyl methacrylate) having an intrinsic viscosity of 1.08 deciliters/grams as measured in toluene at 25° C., which corresponds to a molecular weight of about 400,000.

EXAMPLE II

A graft copolymer is prepared by a solution polycondensation polymerization of the polymer of Example I, poly(styrene-co-hydroxyethylene methacrylate) with 1,4-cyclohexane dimethanol monomer. The graft copolymer is prepared by dissolving 6 grams of the polymer of Example I and 54 grams of the 1,4-cyclohexane dimethanol in 400 grams of methylene chloride which contains 0.22 gram of phenol as a molecular weight regulator and 74 grams of pyridine as a catalyst. The solution is then phosgenated at a rate of 0.7 grams/minute until a temperature drop occurs, which is the end point of the reaction. The resulting graft copolymer is precipitated and washed with methanol. It has an intrinsic viscosity of 0.93 deciliter/gram as measured in chloroform at 25° C.

To establish that the polymer is a graft copolymer, a 10% weight-to-volume solution of the graft copolymer obtained in methylene chloride is cloudy but does not separate into discrete layers after standing at room temperature for 8 hours. A 10% weight-to-volume solution of a 50–50 mixture of poly(styrene-co-hydroxyethyl methacrylate) and 1,4-cyclohexane dimethanol polycarbonate in methylene chloride separates into two discrete layers after standing at room temperature for one-half hour.

EXAMPLE III

Example II is repeated except that neopentyl glycol monomer is employed in place of the 1,4-cyclohexane dimethanol monomer and 99 grams of pyridine are employed in place of the 74 grams of pyridine. The resulting graft copolymer has an intrinsic viscosity of 0.41 deciliter/gram as measured in chloroform at 25° C.

This invention is directed to a thermoplastic graft copolymer consisting of a polymer backbone having pendant thereon groups consisting essentially of aliphatic polycarbonates. The pendant aliphatic polycarbonate groups are attached to the polymer backbone by a carbonate, an ester or a carbamate or mixtures thereof. The thermoplastic graft copolymer contains about 30–95 and preferably 50–90 weight percent of polycarbonate groups and, correspondingly, 70–5 and preferably 50–10 weight percent of the polymer backbone, both being based on the weight of the thermoplastic graft copolymer. In addition, the aliphatic polycarbonate groups consist essentially of the residue of at least two molecules of an aliphatic diol. However, it is conceivable that a very minor number of the groups may be monomeric in that they contain the residue of only one molecule of an aliphatic diol. This would be minor, if at all, and does not detract from the inventive concept of this invention.

This invention is also directed to a unique process for preparing the thermoplastic graft copolymer of the instant invention, which process is a solution condensation graft copolymerization reaction. Heretofore, it was known to prepare graft copolymers by the solution addition polymerization reaction employing free radical anionic or cationic initiators. Now it has been found the graft copolymers can be prepared by condensation polymerization. However, it is necessary to employ a molecular weight regulator as well as an acid acceptor to remove, in this case, the acid being split off. The solution condensation graft copolymerization reaction consists of reacting (1) an organic solvent solution of a polymer containing functional groups pendant thereon, which functional groups are selected from the group consisting of hydroxyl, carboxyl and amine and mixtures thereof, (2) an aliphatic diol monomer and (3) a carbonate precursor in the presence of a monohydroxy molecular weight regulator. More specifically, the polymer is first dissolved in an organic solvent. The aliphatic diol monomer, molecular weight regulator and acid acceptor are then added. A stoichiometric quantity of the carbonate precursor is then fed into the system to condense the aliphatic diol monomer with itself and with the polymer at the point of functionality on the polymer. The resulting polymer is a thermoplastic graft copolymer consisting of a polymer backbone having pendant thereon groups consisting essentially of aliphatic polycarbonates being attached thereto by means of a carbonate, an ester or an amine linkage or mixtures thereof. The reaction is carried out at atmospheric pressure and at a temperature from about 0° C. to about 130° C., neither of which condition is critical or limiting to this invention and is well within the knowledge of one skilled in the art.

The critical feature of the instant invention is that the graft copolymer must be thermoplastic. To insure this, the number of aliphatic polycarbonate groups pendant on the polymer backbone must not be excessive and are preferably less than 50 such aliphatic polycarbonate groups. Otherwise, the graft copolymer prepared in accordance with the practice of this invention will gel or cross-link and produce at thermoset product. For example, when a poly(methyl acrylate-co-acrylic acid) polymer is prepared having a functionality of about 85 is graft copolymerized in accordance with the practice of this invention with 1,4-cyclohexane dimethanol monomer as per Example II, a get results which is insoluble in a solvent such as methylene choloride. This specifically shows that this graft copolymer is cross-linked and not a thermosplastic.

The polymer backbone employed in the practice of this invention may be either a homopolymer, a copolymer or an interpolymer. The essential feature as stated previously is that the polymer backbone must be such that the functional groups are not excessive so as to avoid gelling or cross-linking when forming the aliphatic polycarbonate graft copolymer. A copolymer backbone can be prepared from two monomers containing functional groups or two monomers wherein only one of the monomers contains functional groups. The important feature is that the degree of functionality not be excessive. In addition, an interpolymer backbone can be made by polymerizing monomers of the same type employed to prepare a copolymer backbone. Again the essential feature is that the resulting graft copolymer must be themoplastic.

To determine the number of functional groups or functionality, the following formula is used:

$f = (\overline{P}_n)$ (mole fraction of functional groups in the polymer
$f$ = functionality
$\overline{P}_n$ = number average degree of polymerization The thermoplastic polymers employed to prepare the polymer backbone can be any thermoplastic polymer containing functional groups of either hydroxyl, carboxyl or amines, or mixtures thereof pendant thereon. In the practice of this invention, "pendant" means that the aplicable functional group is not part of the polymer chain but is a side group. Examples of some of the thermoplastic polymers which can be employed in the practice of this invention to prepare the polymer backbone are homopolymers, copolymers and interpolymers of cellulose ethers and esters containing free hydroxyl, carboxyl or amine groups e.g., ethyl cellulose, cellulose acetate, cellulose nitrate, cellulose butyrate; homopolymers, copolymers and interpolymers of monomeric compounds containing the vinylidene group $CH_2=C<$ and which contain free hydroxyl, carboxyl or amine groups such as unsaturated carboxylic acids and derivatives thereof, e.g., maleic acid, acrylic acid, methacrylic acid; and methacrylic acid monoesters of glycols, e.g. hydroxyethyl methacrylate and allyl alcohol. In addition, the thermoplastic polymers can be copolymers and interpolymers of the above functional groups containing monomeric compounds with monomeric compounds containing the vinylidene group $CH_2=C<$ without functional groups and include such monomeric compounds as vinyl halides, e.g., vinyl chloride, vinyl bromide, vinylidene chloride; olefins, e.g. ethylene, propylene, isobutylene; acrylic acid and methacrylic acid esters of alcohols containing 1–18 carbon atoms such as methyl and ethyl methacrylate; acrylamide, methacrylamide; methacrylonitrile; acrylonitrile; vinyl esters of carboxylic acids, e.g., vinyl acetate, vinyl propionate, vinyl benzoate; vinyl ethers, e.g., vinyl methyl ether, vinyl isobutyl ether; vinyl aromatic compounds, e.g., sytrene, alpha-methylstyrene, vinyl toluene, p-ethyl-styrene, 2,4-dimethylstyrene, o-chlorostyrene, 2,5-dichlorostyrene, etc. The preferred polymer backbone to be employed in the practice of this invention is styrene-hydroxyethylmethacrylate.

The molecular weight regulator employed in the reaction process is a monofunctional hydroxy compound such as phenol, cyclohexanol, methanol, p-bromophenol, p-tertiary butylphenol, etc. The amount employed is at least one mole of the molecular weight regulator per mole of the hydroxyl, carboxyl or amine group of the polymer backbone. The use of the molecular weight regulator is essential to the solution polycondensation graft copolymerization reaction in order to avoid the formation of a gel or cross-linked product. The preferred molecular weight regulator is phenol.

Any aliphatic diol which contains as the sole reactive groups two hydroxyl groups can be employed in the practice of thi s invention. Preferably, the aliphatic diols are diols containing 2–25 carbon atoms and typical of those that can be employed in place of the 1,4-cyclohexane dimethanol of Example IV are 1,10-decandiol, 1,14-tetradecandiol, butylene glycol, diethylene glycol, tetra methylene glycol, hexamethylene glycol, propylene glycol, neopentyl glycol, 1,19-nonadecandiol and 1,25-pentacosandiol.

The carbonate precursor employed in the practice of this invention can be either a carbonyl halide or an aliphatic haloformate. The carbonyl halides which can be employed herein are carbonyl bromide, carbonyl chloride, carbonyl fluoride, etc., or mixtures thereof. The aliphatic haloformates suitable for use herein include bishaloformates of glycols (bis-haloformates of ethylene glycol, neopentyl glycol, polyethylene glycol, etc.). While other carbonate precursors will occur to those skilled in the art, carbonyl chloride, also known as phosgene is preferred.

The reaction is carried out in the presence of an acid acceptor, which acid acceptor may be either an organic or an inorganic compound. A suitable organic acid acceptor is a tertiary amine and includes such materials as pyridine, triethyl amine, dimethyl aniline, tributyl amine, etc. The inorganic acid acceptor may be one which can either be an hydroxide, a carbonate, a bicarbonate or a phosphate of an alkali or alkaline earth metal.

The composition of the instant application has many uses for forming molded parts or for forming sheet and films. The molded parts can be formed by injection molding or compression molding.

It will thus be seen that the objects set forth above, among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A thermoplastic graft copolymer consisting essentially of a polymer backbone with pendant groups thereon consisting essentially of aliphatic polycarbonate groups which are attached to the polymer backbone by radicals selected from the group consisting of carbonates, esters and carbamates, and mixtures thereof; said thermoplastic graft copolymer consisting of about 30–95 weight percent of aliphatic polycarbonate units and correspondingly 70–5 weight percent of the polymer backbone wherein said polymeric backbone is formed from the polymerization of monoethylenically unsaturated monomers having pendant hydroxy, carboxy or amine groups and wherein said aliphatic polycarbonate groups consist of the residue of at least two molecules of an aliphatic diol.

2. The thermoplastic graft copolymer of claim 1 wherein the polymer backbone contains an average of less than 50 aliphatic polycarbonate groups pendant thereon per molecule.

3. The thermoplastic graft copolymer of claim 1 wherein the polymer backbone is a styrene-hydroxyethylmethacrylate copolymer with the pendant aliphatic polycarbonate groups being attached to the polymer backbone through carbonate linkages.

4. A process for preparing a thermoplastic graft copolymer consisting of a polymer backbone having pendant thereon groups consisting essentially of aliphatic polycarbonate groups, which process consists of the solution condensation graft copolymerization reaction at a temperature of 0° C.–150° C. and atmospheric pressure of (1) an organic solvent solution of a polymer formed by the reaction of monoethylenically unsaturated monomers containing functional groups pendant thereon, which functional groups are selected from the group consisting of hydroxyl, carboxyl and amines and mixtures thereof, (2) an aliphatic diol monomer and (3) a carbonate precursor selected from the group consisting of carbonyl halides and aliphatic haloformates and mixtures thereof, and wherein said solution condensation graft copolymerization reaction is carried out in the presence of a monohydroxy molecular weight regulator.

5. The process of claim 4 wherein the aliphatic diol contains 2–25 carbon atoms.

6. The process of claim 4 wherein the carbonate precursor is phosgene.

7. The process of claim 4 wherein the aliphatic diol is neopentyl glycol and the carbonate precursor is phosgene.

8. The process of claim 4 wherein the monohydroxy molecular weight regulator is phenol.

9. The process of claim 4 wherein the reaction is carried out in the presence of at least one mole of the molecular weight regulator per mole of the polymer backbone.

No references cited.

MURRAY TILLMAN, Primary Examiner

P. LIEBERMAN, Assistant Examiner

U.S. Cl. X.R.

260—75, 13, 16